Patented Mar. 23, 1937

2,074,339

UNITED STATES PATENT OFFICE 2,074,339

PREPARATION OF CELLULOSIC MATERIAL

George W. Miles, Boston, Mass., assignor to Celanese Corporation of America, a corporation of Delaware No Drawing. Application March 13, 1934, Serial No. 715,302

7 Claims. (Cl. 92—9)

This invention relates to the purification and preparation of cellulosic material such as wood, straw, grass, cotton linters, etc. prior to use and/or esterification of the same.

An object of this invention is the economic and expeditious preparation and purification of cellulosic materials as found in nature to a cellulosic material of high purity suitable for use in forming esters and ethers of same that are free of color. Other objects of the invention will appear from the following detailed description.

For the production of inorganic or organic esters of cellulose, that are to be formed into lacquers, films, foils, filaments or solid articles, substantially pure cellulose is required as the starting material; otherwise the products made from such cellulose esters are colored, opaque and/or develop haze and color upon ageing or exposure to light and heat. For the purpose of lending strength and toughness to the films, filaments and articles made of such cellulose esters, it is also essential that the cellulose used be as undegraded as possible. By employing this invention a pure undegraded cellulose is formed from naturally contaminated cellulose materials as found in nature.

By this invention the lignin, pentosan, and unesterifiable cementing material and shell material, as found in nature, are expeditiously removed from the cellulose without substantial depolymerization or degradation of the cellulose; thus wood chips, grass, straw and other types of vegetable materials may commercially be employed as the source of cellulose for making cellulose esters which heretofore was deemed unpracticable. Cellulose obtained by the soda, sulphate or sulphite processes have proven to be not commercially valuable as a source of cellulose for esterification purposes in that they do not produce a pure cellulose, and when attempts are made to purify the products, there is produced a degraded cellulose. When attempt is made to esterify such celluloses, they give rise to many objectionable features, their products are colored, of widely varying degrees of esterification, one part forming gels before another part has started to esterify and many other troubles. Cellulose, obtained by this invention however, is pure and in a condition to be readily and economically esterified.

In accordance with my invention I treat the natural cellulosic material, preferably cut or ground to short lengths or chips, with a dilute nitric acid solution in water at elevated temperatures for a period of time to render the cementing material, lignin and similar non-esterifiable materials soluble or removable in an alkaline solution. Thereafter the material is preferably treated with a solution of alkali to dissolve and remove the materials other than the pure and undegraded cellulose. The cellulose may then be esterified in a normal manner with or without a pretreatment with low boiling organic acids such as formic acid, acetic acid, etc. The purified cellulose may then be commercially esterified to form cellulose nitrate of any desired degree of nitration or to form organic esters of cellulose such as cellulose acetate, cellulose formate, cellulose propionate and cellulose butyrate. The pure cellulose prepared according to this invention may also be etherified to organic ethers of cellulose such as methyl cellulose, ethyl cellulose or benzyl cellulose, or formed into mixed esters and/or ethers of cellulose. The cellulose being a pure substantially undegraded cellulose may be used for all purposes that require a high grade cellulose, thus it may be formed into paper, worked into reconstituted cellulose yarns and films, and other uses.

The raw cellulosic material will require various amounts and concentrations of treating baths according to the nature of the raw material and its degree of resistance to such treatments. For instance, each type of wood chips will require slightly different strengths of treatment according to the amount of non-cellulose material that they contain. Also the size of the pieces being treated and the amount of mechanical aid during treatment will have a bearing upon the length of treatment. For the purpose of treating wood chips of poplar, hemlock and spruce of a size customarily employed in a sulphite paper making process, the dilute nitric acid bath is preferably about four times the weight of the dry chips. The solution of nitric acid should be of such a dilute strength that it will react upon the non-esterifiable materials and exert little or no hydrolizing action or esterifying action upon the cellulose. It is found that the nitric acid selectively reacts with the lignin and fiber cementing materials prior to any action upon the cellulose. The nitric acid may be present in the bath in concentrations of from 0.5 to 10%.

By employing this invention there is no necessity of employing super-atmospheric pressure; however, such super-atmospheric pressure may be employed to hasten the reaction or digestion. An advantage of the invention however is that the wood chips are purified to pure cellulose without the aid of expensive equipment such as digestors or cookers that are adapted to withstand high pressures such as those employed in the sulphite or sulphate paper making processes. The high pressure cookers are employed in the paper making processes to prevent depolymerization, hydrolysis, etc. of the cellulose and to exclude air that tends to promote such reactions. In employing this invention this precaution is not necessary as the treatments are all carried out below a boiling temperature and therefore the only contact with the air is at the surface and no detrimental effects appear from such contact. According to this invention the wood chips may be placed in closed, open or semi-open cooking vessels containing the dilute nitric acid bath and maintained at just slightly below boiling temperature for from 4 to 24 hours depending upon the nature of the wood chips. A more pure product is sometimes obtained by soaking the chips in the heated nitric acid bath for from 4 to 9 hours draining off the bath and washing the chips and then subjecting them to a second treatment in a nitric acid bath for a similar period of time.

After treatment in the nitric acid bath or baths the wood chips, or other cellulosic material, may be washed and then treated, or soaked at elevated temperatures in a closed, open or semi-open vessel with a sodium or potassium hydroxide solution for from 3 to 8 hours. The solution may contain from less than 1 to more than 3% of the caustic alkali material and the quantity of the solution or bath should preferably be from 3 to 10 times the weight of the dry chips or other material. This treatment dissolves the nitric acid treated, lignin, pentosans and other cementing materials such that upon filtration and washing the filtered material is substantially pure undegraded cellulose of clean white color.

This invention is also applicable to the treatment of raw cotton linters, such as are obtained from cotton seeds. In treating cotton linters the treatment baths may be less concentrated and/or the periods of treatment greatly shortened from those specified above. For example, cotton linters are freed of seed hulls and other non-cellulosic material by treating with a nitric acid solution of about 1 to 7% concentration for a period of 1 to 4 hours depending upon the amount of impurities in the raw linters after which they are treated with caustic soda and washed. Alternatively the nitric acid treated linters may, instead of the caustic soda treatment, be treated with aqueous solutions containing the hypochlorites of sodium, potassium, or calcium, say about 20% of their dry weight of bleaching powder. Alternatively, the material may be treated with the hypochlorite solution after treatment with alkali. The linters are then washed free of impurities and excess reagents.

In order to remove any silica that may be present in the cellulosic material being treated, the same may be treated with small amounts of hydrofluoric acid in solution, either before, during or after treatment with the nitric acid.

For the purpose of further describing the invention and not as limitations the following examples are given.

Example I 100 parts of poplar wood chips are placed in 300 parts by weight of a solution containing about 8% nitric acid in water. This mixture is maintained at about 100° C. or slightly less for about 9 hours then filtered and the solid material washed. The solid material may then be given a second treatment in an 8% nitric acid bath similar to the first. The material is then drained of acid solution and washed after which it is placed in 5000 parts by weight of the dry starting chips of a 1% solution of potassium or sodium hydroxide in water and heated to about 95° C. for 5 hours. The caustic solution may then be drained from the material and the material washed.

The resulting product is an exceptionally pure substantially undegraded cellulose suitable for esterification or other treatment to form substitution derivatives of cellulose. The product contains no hydrolized or otherwise affected cellulose. If small amounts of hydrolized cellulose are formed in the treatment, they are removed by the washings and do not show up in the final product.

Example II 500 parts by weight of raw cotton linters are placed in about 6000 parts of a 2% solution of nitric acid in water and heated for 2 hours to about 100° C. or less. The linters are then washed and placed in about 5000 parts of a 1% solution of potassium or sodium hydroxide solution and heated to about 93° C., and then washed.

The resulting product is a pure cellulose, white in color and uniform in properties.

Example III

Cellulose purified by either Example I or II is bleached by treating with a bath containing bleaching powder. The bath is formed of 5000 parts water and 100 parts sodium hypochlorite. This removes any remaining traces of impurities and results in a pure cellulose of uniform properties and not contaminated or colored.

Having described my invention what I desire to secure by Letters Patent is:

1. Process for the manufacture of cellulose from natural cellulosic materials, which comprises converting the noncellulosic constituents of the materials into compounds soluble in a dilute alkali solution by heating with nitric acid of concentration less than 10% to a temperature below the boiling point of the acid and removing the said compounds by solution in a hot dilute solution of an alkaline hypochlorite.

2. Process for the manufacture of cellulose from natural cellulosic materials, which comprises treating the materials with nitric acid and with alkali, the whole of the nitric acid treatment being effected before the treatment with alkali by means of aqueous nitric acid of concentration between 0.5 and 10% at a temperature of at least 90° C. but below the boiling point of the aqueous nitric acid.

3. Process for the manufacture of cellulose from natural cellulosic materials, which comprises treating the materials with nitric acid and with alkali, the whole of the nitric acid treatment being effected before the treatment with alkali by means of aqueous nitric acid of concentration of the order of 8% at a temperature of at least 90° C. but below the boiling point of the aqueous nitric acid.

4. Process according to claim 2, in which the alkali treatment is effected with a hot dilute solution of a caustic alkali.

5. Process according to claim 2, in which the alkali treatment is effected with a hot dilute solution of an alkaline hypochlorite.

6. Process according to claim 2, in which the alkali treatment is effected with a 1–3% solution of caustic alkali at a temperature slightly below its boiling point.

7. Process according to claim 2, in which the alkali treatment is effected with a 1–3% solution of sodium hydroxide at a temperature slightly below its boiling point.

GEORGE W. MILES.